Nov. 1, 1927.

H. P. CORBIN

AGRICULTURAL IMPLEMENT

Filed July 20, 1925

Inventor.
Henry P. Corbin
by L.C. Shonts Atty.

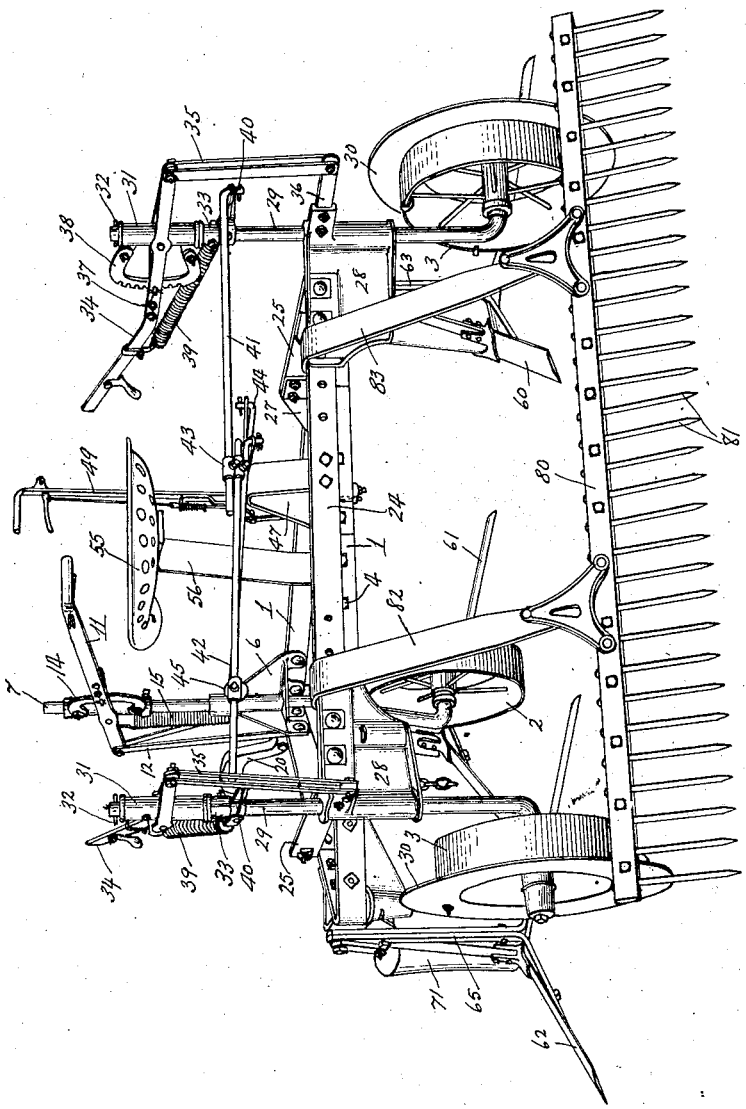

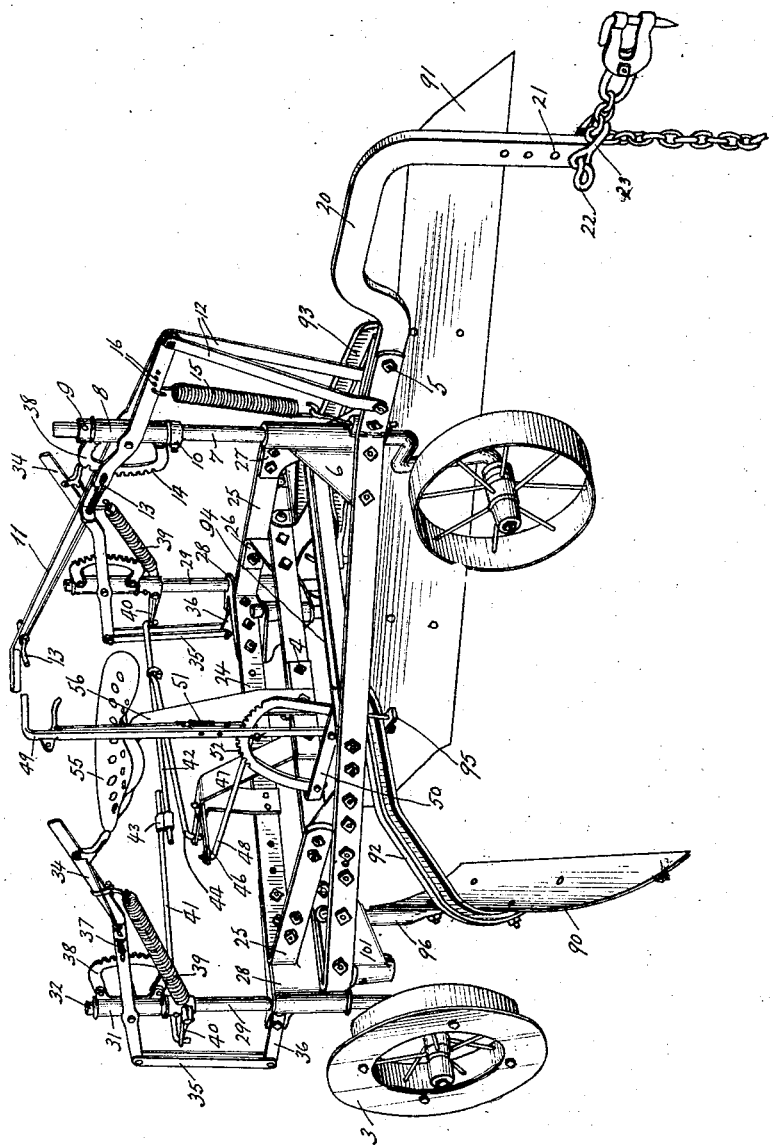

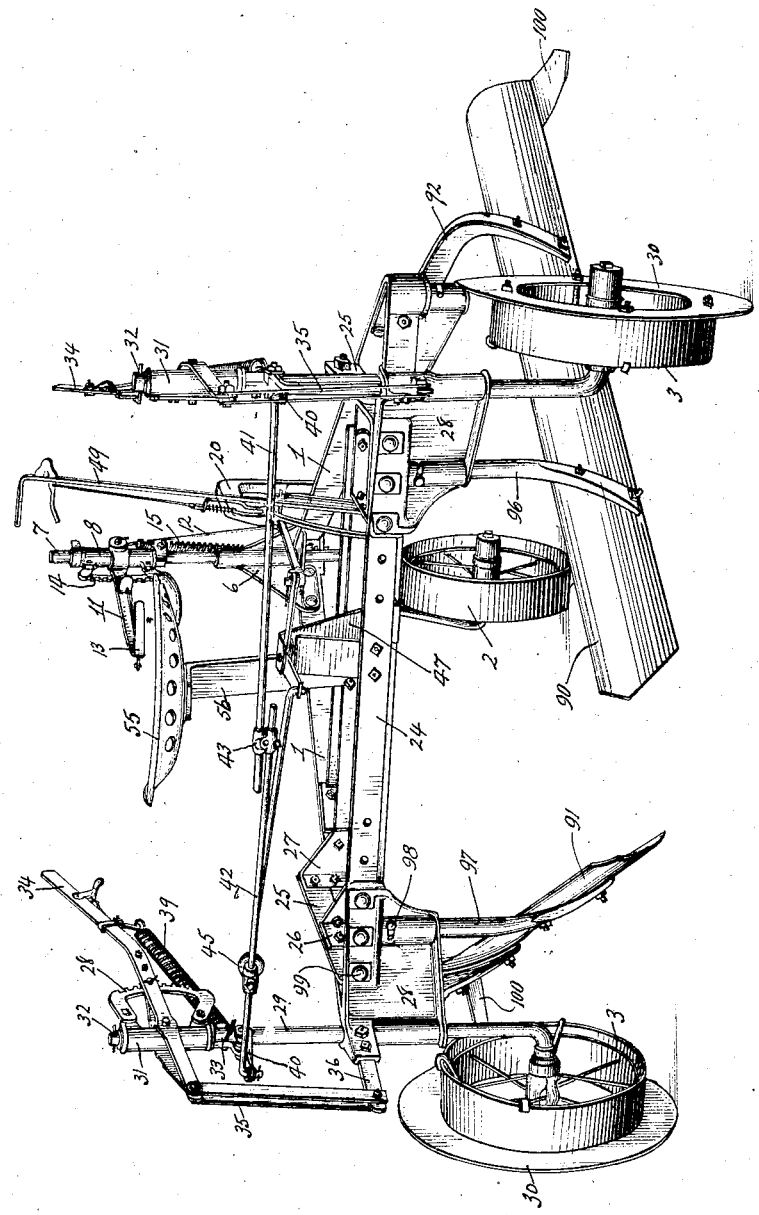

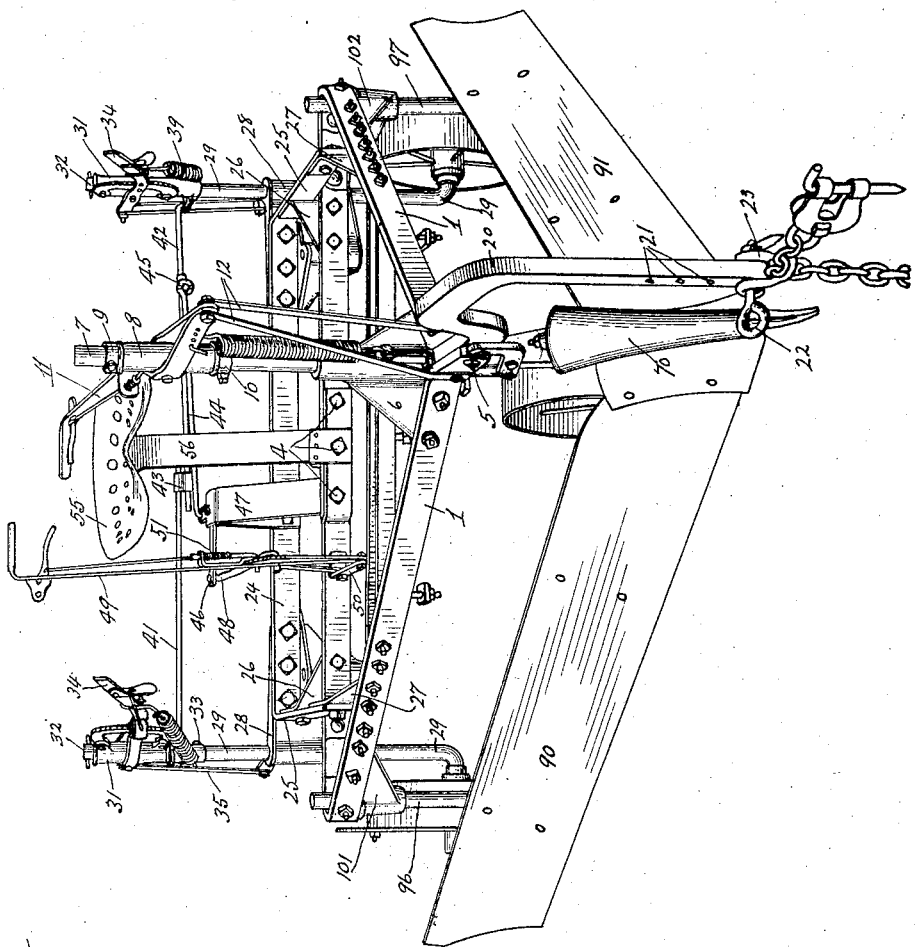

Patented Nov. 1, 1927.

1,647,607

UNITED STATES PATENT OFFICE.

HENRY P. CORBIN, OF MOLINE, ILLINOIS, ASSIGNOR TO MOLINE IMPLEMENT COMPANY, OF MOLINE, ILLINOIS, A CORPORATION OF ILLINOIS.

AGRICULTURAL IMPLEMENT.

Application filed July 20, 1925. Serial No. 44,647.

The invention relates to an agricultural implement.

It relates particularly to an implement for cultivating coffee trees and for treating the ground under the trees during and after the harvest season.

Coffee grows on trees which are usually set out in rows about twelve feet apart with the trees of each row also about twelve feet apart. The trees are planted with regularity in order that they may be cultivated in different directions. They are rather low and bushy. A tractor used between them should have shields or guards on it to prevent damage to the overhanging limbs of the trees.

The usual practice is to cultivate the ground between the trees early in the season to keep down weeds and to keep the soil in proper condition. When the crop matures, it is picked from the trees, but a considerable portion of it drops to the ground during the ripening season and in the course of the harvest. In order to save this part of the crop, the loose ground under the trees is removed so as to leave a relatively hard surface from which the coffee beans can easily be picked. After the coffee beans have been picked from under the trees, the loose ground is again thrown around them so as to place the field in a level condition for cultivation during the next season.

The operations of removing the loose earth from under the trees to provide a flat surface for receiving the falling coffee beans and returning the loose earth under the trees after the harvest have been performed by hand. These operations are long and tedious and require much labor. The present invention has been devised to provide an implement which cannot only be used to cultivate the soil between the trees but which can also be used for removing the loose earth from under the trees to provide a proper bed for receiving the fallen coffee beans and can further be used to return the loose earth under the trees after the harvest season.

It is important that the implement be such that it can be pulled between the trees without damaging the branches; it preferably must be an implement that can be pulled by a tractor; and it especially must be an implement which can be turned at right angles in the field, that is, when a tractor is attached to it, the outfit must be capable of turning from one row at right angles into a row running in the opposite direction and then at right angles again to go back in the opposite direction on another row. This is necessary because such a large number of fields are surrounded by sunken driveways and the trees are planted out to the edge. There is no space for turning beyond the last trees.

The general object of the invention is to provide an improved agricultural implement for use in coffee growing and harvesting.

A more particular object is to provide an implement that is capable of a variety of uses such as cultivating between coffee trees, removing loose earth from under coffee trees to provide a bed for receiving coffee beans, and returning loose earth under the trees after the crop has been harvested.

A further object is to provide an implement of this character which can be turned sharply so as to permit it to be turned around in the field between the rows of trees without endangering any of them.

Other objects of the invention will hereinafter appear.

An embodiment of the invention is illustrated in the drawings in which;

Figure 2 is a rear perspective of the implement illustrated in Figure 1.

Figure 3 is a front perspective of the implement as used for removing the loose earth from under the coffee trees to provide a smooth bed to receive falling coffee beans.

Figure 4 is a rear perspective of an implement as shown in Figure 3.

Figure 5 is a front perspective of the implement as used in returning the loose earth under the trees after the coffee has been harvested.

Figure 1:
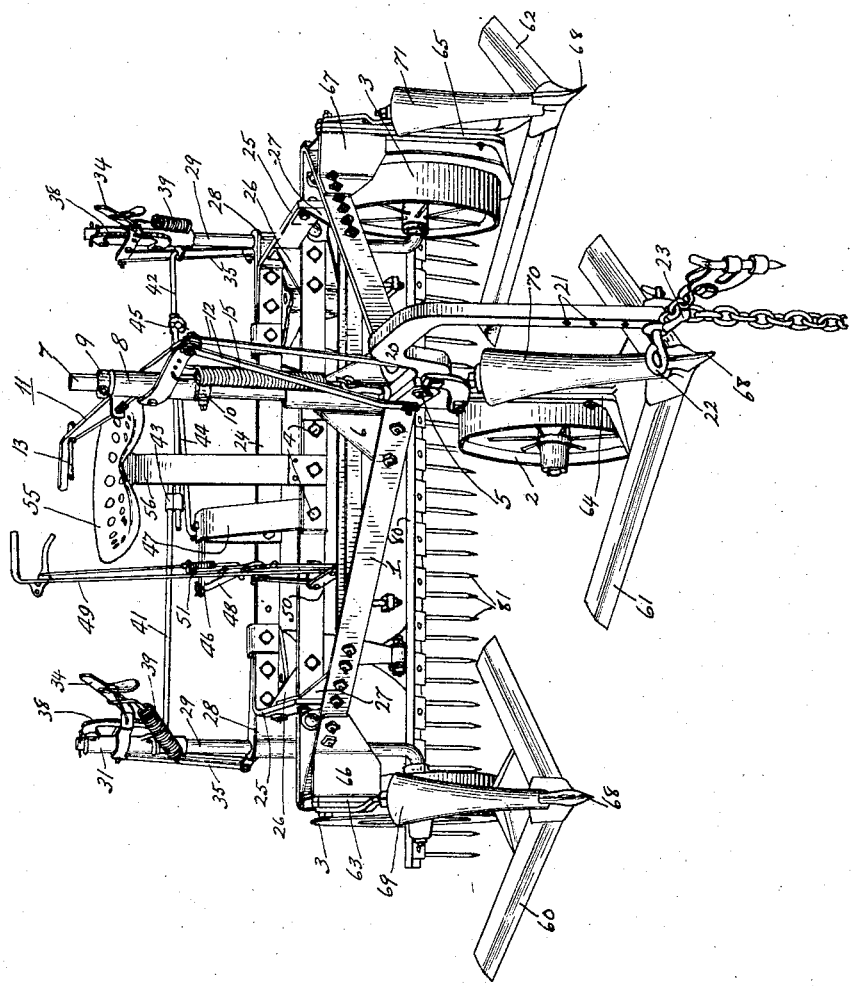
Figure 1 is a front perspective of the implement as used for cultivating.

One of the controlling factors in the production of this implement has been the desire to make one implement which will perform a maximum number of operations and at the same time be simple and inexpensive in construction. In addition, the implement must be capable of adjustment in all its uses in order to be flexible enough to meet varying requirements. This has required close study and experiment and special effort has been placed on making the implement as simple as possible. Simplicity has been achieved and at the same time the implement is capable of performing efficiently a variety of operations.

The implement includes a triangular frame 1 supported at the front by a caster wheel 2 and at the rear by two steering wheels 3. The supporting wheels are preferably located near the corners of the triangular frame and each wheel may be adjusted up or down to vary the height of any corner of the frame.

The frame 1 is triangular in shape. As illustrated it is made of two bars of metal which are bolted together at the rear at the points 4 and at the front at the points 5. The two forward ends of the bars are also bolted to a front bracket 6 at the forward apex of the frame. The exact shape of the frame and the material of which it is made may, of course, be varied to suit the requirements, but the above has been found to be a simple, inexpensive and durable construction.

The front caster wheel 2 is carried by an axle 7 which is journalled in the front bracket 6 so as to be free to turn about a vertical axis. A sleeve 8 is mounted loosely on axle 7 between two adjustable stops 9 and 10 carried by the axle near its upper end. Pivoted to the sleeve 8 is a lever 11, the forward end of which is pivoted to links 12 which are connected at their lower ends to the frame 1. The lever 11 extends rearward and carries a latch 13, illustrated in Figure 3, co-operating with a toothed segment 14 supported by the sleeve 8. A spring 15 is connected at one end in any one of a series of holes 16 at the outer end of the lever and at the other end to the frame. By adjusting the lever 11 the caster wheel may be moved downwardly relative to the frame or vice versa, the effect being to adjust the height of the frame relative to the ground. The spring 15 serves to normally bias the frame upwardly and makes the raising easier. This adjustment may be accomplished without interfering with the castering action of the wheel which may move freely in any of the adjusted positions.

Bolted between the forward ends of the frame bars is a draft bar 20 which extends forwardly and has its front end bent down and provided with a series of holes 21 to receive the pin 22 of a clevis or similar draft device 23. This draft connection, when shaped as illustrated, leaves clearance for the operation of the tools which are mounted in front of the caster wheel.

The rear of the frame 1 carries a sub frame having a rear member 24 and two side members 25. The side members rest on the rear portion of the frame 1 and are connected to it by the metal brackets 26. These members also extend forwardly and are fastened to the side members of frame 1 by the brackets 27. Bolted to the corners of the sub frame are bearing brackets 28 in which the axles 29 carrying the rear wheels 3 are journalled to turn about vertical axes. These brackets may be adjusted inwardly to vary the width of tread of the implement by connecting them in the different holes illustrated in the rear member 24.

The rear wheels 3, which are journalled on the axles 29, each have a broad run to prevent them from sinking into soft soil and each has a flange 30 to cut into the soil to make the wheels effective as steering wheels. The wheels are adjusted vertically through the medium of sleeves 31 mounted loosely on the axles 29 between stops 32 and 33 carried by the axles near their upper ends. Each sleeve has a lever 34 pivoted to it. The forward end of each lever is pivoted to links 35 that in turn are connected to their lower ends to extensions 36 on the brackets 28. Each lever carries a latch 37 co-operating with a sector 38 supported by its respective sleeve 31. Each lever is also provided with a spring 39 which normally biases the lever 20 to assist in raising the frame 1.

By adjusting either or both of the levers 34, the height of either or both of the rear corners of the frame may be varied without interfering with the turning of the rear wheels about a vertical axis.

In order to make the implement capable of turning in a short radius the rear wheels are made steerable so that, when the front end of the implement starts to turn, the rear wheels may be guided around to throw the rear end of the implement around quickly to make the turn at almost right angles. The rear wheels are steered through the medium of the arms 40 fixed to the lower stops 33 carried by the axles 29. Links 41 and 42 are pivoted to the respective arms 40 and these links extend inwardly where they are connected together by a clamp 43. A link 44 is connected to the link 42 by the clamp 45 and the other end of the link is connected to one arm of a bell crank lever 46 pivoted on a brace 47. The brace 47 is connected to the rear member 24 of the sub frame and to the rear portion of frame 1. It serves as a brace between the frames as well as a support and mounting for the bell crank lever. The other end of the bell crank lever is connected by a link 48 to the adjusting lever 49 which is pivoted to a cross member 50 on the frame 1. The lever carries a latch 51 co-operating with a toothed sector 52 also supported by the frame. By adjusting the lever 49 the bell crank lever 46 is swung on its pivot and through the medium of the links 44, 42 and 41 both of the rear axles are swung in unison. In this way, both the rear wheels may be steered by moving the lever 49 forward or backward.

All the levers are positioned so as to be easily available for manipulation by an operator who occupied the seat 55 carried by the seat spring 56 bolted to the frame.

When the implement is to be used for cultivating ground between coffee trees, it must cultivate a strip wider than the implement itself and, for this purpose, three sets of cultivating tools are used, one being carried at each corner of the implement. These tools are in the form of sweeps 60, 61 and 62 carried by arms 63, 64 and 65 respectively connected to the frame. The arms of the two sweeps 60 and 62 are directly connected to brackets 66 and 67 respectively which are bolted to the frame. These brackets may be adjusted along the frame to vary the position of the sweeps and thus vary the width of the strip cultivated by the implement, but the position shown is the preferable one. The two rear sweeps are mounted in front of the two rear wheels and the front sweep is mounted in front of the front wheel. The width of the sweeps is such that the strips cut by the rear sweeps slightly overlap that cut by the front sweep so that all the soil for the full width of the implement is cultivated. Also, the outside arms of the rear sweeps extend beyond the sides of the implement so as to cultivate ground beyond the sides of the implement, thereby permitting close cultivation to the trees without striking them with the wheels or the frame of the implement. Each sweep carries a digging or cultivating point 68 which plows a small furrow and the cutting knives follow, cutting under the surface of the soil which passes up over the blades. This gives a shallow cultivation which destroys the weeds without damaging the roots of the coffee trees.

In order to prevent weeds and rubbish from accumulating on the tools, conical rollers 69, 70 and 71 are carried by the cultivating tools at their forward edges. These rollers are inclined rearwardly and are mounted to rotate freely, the larger ends of the cones being toward the top. The shape and position of the rollers together with the fact that they may turn easily in either direction causes the trash to move off of them quickly and to move downwardly while it is moving instead of sliding upwardly and getting caught in the implement.

The depth of each cultivating tool is regulated by varying the height of the corner of the frame near which it is attached. This gives a quick, easy and effective adjustment that may be made without stopping the implement.

In order to further pulverize the soil, a harrow 80 is carried at the rear of the implement. This harrow comprises a transverse bar carrying a plurality of teeth 81 which pulverizes the ground that has been loosened by the cultivating devices. It also loosens the soil that may be slightly packed by the wheels. The harrow bar is carried by two spring arms 82 and 83 bolted to the implement frame. The resilience of these arms coupled with the fact that the harrow is inclined forwardly permits the bar to rise over any rubbish that may accumulate and at the same time holds it into the ground with sufficient force to cause it to pulverize the soil behind the implement.

In operation, the implement is driven between the rows of coffee trees with the height of the wheels adjusted so as to give the proper operating depth to the cultivating sweeps. The implement cultivates a strip for the full width of the implement and for a considerable distance on each side of it. All weed roots are cut, the ground is stirred up and it is then pulverized by the harrow member at the rear. Usually the implement is pulled by a tractor. While it is necessary to turn in the field between the trees, this may be easily done by turning the tractor, which turns the front end of the implement while the rear end is quickly steered around by throwing the rear wheels in a direction opposite to that in which it is desired to turn. In this way, a turn may be made within a very short radius without striking any of the trees and the use of the implement in present coffee fields is made feasible.

When the cultivating season has ended and the harvest approaches, it is desirable to scrape the loose dirt from under the trees and provide a hard smooth surface from which the fallen coffee beans may be easily gathered. The same implement may be used for this purpose by removing the cultivating sweeps and by mounting the two scraper blades 90 and 91 in the position shown in Figures 3 and 4.

These blades are carried by arms 92 and 93 adjustably bolted to a cross brace 94 and clamped to the frame by clamps 95. By adjusting the front end of the arms, the angle of the blades may be changed. The rear ends of the blades are carried by arms 96 and 97 mounted in the rear brackets 28. The blades extend beyond the sides of the implement and the outer end of each carries a shoe 100. They converge rearwardly toward the center of the implement so that, as it is pulled forward, the loose earth is scraped toward the center and left in a windrow between the trees. The depth to which the blades scrape may be adjusted by adjusting the height of the implement wheels. This inclination in a vertical plane may be varied by adjusting the relative positions of the front and rear wheels. Their inclination in a horizontal plane may be varied by adjusting the connections of the blades to the frame.

In operation, the implement is pulled between the rows first up and down the field and then crossways. In this way all the loose earth is scraped from under the trees and a smooth, hard bed of dirt remains under the trees to catch the falling coffee beans.

After the harvest, and when it is desirable to move the loose earth back under the trees, the position of the blades is reversed and they are mounted as shown in Figure 5 so that they converge forwardly. The front ends are attached to an arm similar to the one that carries the forward sweeps and the front conical roller 70 is mounted in position to prevent weeds and trash from catching at the apex of the machine. The rear ends of the blades are carried by the arms 96 and 97. These arms are mounted in brackets 101 and 102 in the rear corners of the frame 1.

In operation, the implement is pulled between the rows of trees with the blade set at the proper depth to scrape the earth back under the trees. The forward or plowing edge is kept at the center of the row of earth and this earth is moved out to the side and evenly distributed between the trees.

It will thus be seen that one implement has been provided which may be used for three different purposes and it may be so used without any alterations. It may be easily adjusted for depth when in any of its uses. The various tools may be adjusted on the frame with facility to meet varying requirements. The changing of the tools is a simple matter and, in part, the same connections and devices are used for different purposes by mounting them differently on the implement frame. The entire structure is simple and relatively inexpensive, yet it has been found to be efficient in operation and it takes the place of quite a large number of laborers who have heretofore been employed to perform these operations by hand.

It is to be understood that the structures shown are for purposes of illustration and that variations may be made in it without departing from the spirit and scope of the invention as defined by the appended claims.

I claim:

1. An implement for use in coffee growing having a triangular frame with a forwardly located apex, a supporting wheel for the forward corner of the frame, a pair of steerable rear wheels for the rear corners of the frame, means for steering the rear wheels in unison and for holding them in any steered position, individual cutting sweeps carried at each corner of the frame in front of the respective supporting wheels for said corners, and means for adjusting the height of the frame to vary the working depth of the sweeps.

2. An implement for use in coffee growing, having a frame, soil working devices carried thereby, a front caster wheel carried by an axle journalled to the frame on a vertical axis, means for adjusting the axle vertically relative to the frame, a pair of steerable rear wheels each carried by an axle journalled to the frame on a vertical axis, an adjusting means for each rear axle to adjust it vertically relative to the frame, and steering means connected to the rear axles for turning them in unison about their vertical axes, said steering means including a mechanism for holding the rear wheels in any of the positions to which they may be moved by the steering means.

3. An implement for use in coffee growing, having a triangular frame, a caster wheel supporting the forward corner of the frame, a steerable rear wheel for each of the rear corners of the frame, means for steering the rear wheels in unison, independent means for each of the rear wheels and for the front wheel for varying the height of the wheels relative to the frame, the corners of said frame being constructed so as to receive and support a variety of soil working tools.

4. An implement for use in coffee growing having a triangular frame, a supporting wheel for each corner of the frame, means for guiding the rear supporting wheels to guide the implement, angular shaped cutting sweeps mounted at each corner of the frame, and tapered rollers mounted at the apex of each angular sweep with the tapered ends pointing downwardly.

5. An implement for use in coffee growing having a triangular frame, soil working devices carried thereby, a front caster wheel at the forward apex of the frame, a supporting wheel at each of the rear corner of the frame, an operator's seat positioned at the rear of the frame, independent means for raising and lowering each of the supporting wheels including levers positioned where they my be conveniently manipulated from the operator's seat, and means for steering the rear wheels in unison including a lever positioned adjacent the operator's seat provided with a latch to hold it in various positions to which it may be moved.

6. A combination tractor-drawn implement for use in coffee growing having a triangular frame, a supporting wheel for each corner of the frame, means for steering the rear wheels to guide the implement, and connections associated with the frame for supporting cultivator sweeps at the corners of the frame and for supporting scraper blades substantially at right angles to the forward sides of the frame and also for supporting said blades substantially parallel to said sides.

In testimony whereof, I affix my signature.

HENRY P. CORBIN.